Jan. 11, 1927.
L. HOFSTAD
1,614,001
DEVICE FOR RELEASING TRACTOR CLUTCHES
Filed June 12, 1926
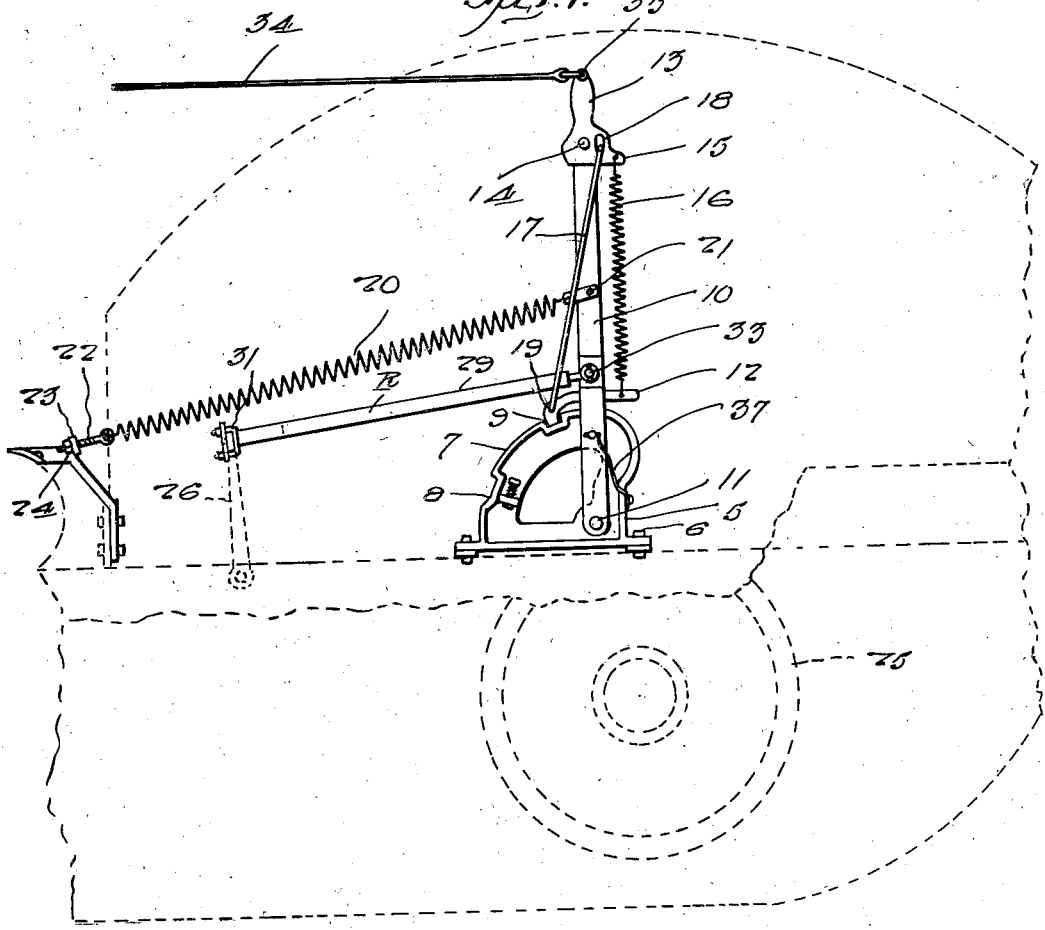
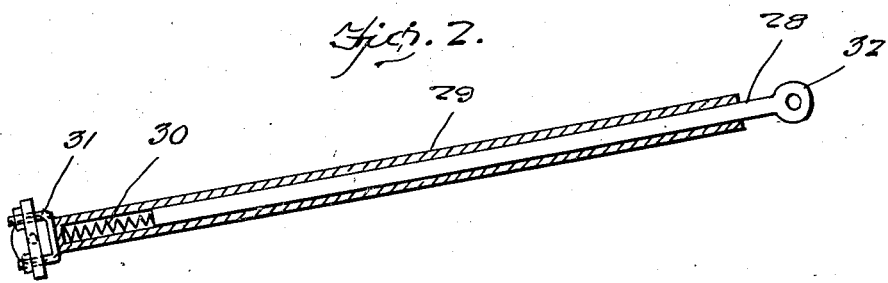
Inventor
L. Hofstad
By Clarence A. O'Brien
Attorney Patented Jan. 11, 1927.

1,614,001

UNITED STATES PATENT OFFICE.

LEIF HOFSTAD, OF AMBROSE, NORTH DAKOTA.

DEVICE FOR RELEASING TRACTOR CLUTCHES.

Application filed June 12, 1926. Serial No. 115,510.

The present invention relates to a device for releasing a tractor clutch by means of a lever and a spring controllable from a point at some distance from the tractor and the advantage of the device is to provide a tractor which can be stopped by means of a line from a machine to which it is belted, thus eliminating, to a certain extent, an additional workman.

Another very important object of the invention is to provide a device of this nature which may be attached to a large number of tractors now in common use to operate efficiently and in a reliable manner therewith.

A still further very important object of the invention is to provide a device of this nature which is simple in its construction, inexpensive to manufacture, strong, durable, easy to manipulate, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is an elevation of the device showing the manner in which the same is used in conjunction with a tractor, and Fig. 2 is a longitudinal section through a telescopic connecting rod used in conjunction with the device.

Referring to the drawing in detail, it will be seen the numeral 5 designates a base attached to the tractor by means of suitable or any preferred fastening elements 6. This base 5 is provided with a quadrant 7 having a pair of notches 8 and 9 formed therein. A lever 10 is pivoted as at 11 to the base 5 and has a dog 12 pivotally mounted thereon for associating with the notches 8 and 9.

A handle 13 is pivoted to the upper end of the lever 10 as at 14 and has a lateral extension 15 to which is attached a spring 16 also attached to the free end of the dog 12 so as to normally hold said dog 12 in engagement with the quadrant 7 during the movement of the lever 10. A link 17 has a loose connection 18 with the pivoted handle 13, and a pivotal connection as at 19 with the engaging end of the dog 12, so that when the handle is pivoted in one direction, said dog will be released from engagement with either of the notches 8 and 9.

A coiled spring 20 is attached to an intermediate portion of the lever 10 as at 21 while the other end thereof is on an eye bolt 22 extending through a portion 23 of the tractor on which the base 5 is mounted so that the spring 20 may be tensioned by a nut 24 on the bolt 22.

A conventional form of tractor is illustrated partially in Fig. 1, by dotted lines and includes the usual operating pulley 25 and clutch pedal 26. A telescopic rod R is disposed between the lever and the clutch pedal. This telescopic rod R includes an inner section 28 slidable in a tubular section 29, a spring 30 being disposed in the tubular section 29 for urging the inner section 28 outwardly thereof to a certain extent. A U-bolt structure 31 is provided on the end of the outer section 29 for engagement with the clutch pedal 26, while an eye 32 is formed on the outer end section 28 for pivotal connection as is illustrated at 33 in Fig. 1, with the lever 10 above the dog 12.

A cable or any other suitable means 34 is attached as at 35 to the upper extremity of the handle 13, and terminates at a convenient point on the machine being operated by the pulley 25 of the tractor. It will be readily seen, therefore, that by pulling upon the cable 34, the handle 13 will be rocked to disengage the dog 12, through the intermediacy of link 17, from engagement with the notch 9, thereby allowing the continued pulling of the cable and spring 20 to swing the lever 10 until the dog engages the notch 8 at which time the clutch pedal will be disposed in its releasing position since the rod 28 will have telescoped as far as possible into the tubular section 29, thereby causing the pedal 26 to swing the lever.

In order to return the lever 10 to the extreme right position as shown in Fig. 1, it is necessary that the operator grasp the handle 13 and swing the same to the right until the dog 12 engages in the notch 9.

The resilient connection which is provided by the sections 28 and 29 and the springs 30 of the rod R allows for compensation of the necessary play. It is to be noted that as soon as the dog 12 has been released from the notch 9, the spring 20 is tensioned sufficiently to actually pull the lever 10 so as to release the clutch. This spring 20 may be maintained at proper tension through the nut 24 and bolts 22.

When the device just described is not to be used, a safety member in the form of a strap 37 may be used, this strap being attached either to the lever 10 or the quadrant 7 and having detachable connection either with the quadrant 7 or the lever 10. When the lever 10 is thus locked against use by the strap 37 or other suitable means, it will be seen that the rod R permits the free operation of the clutch pedal 26 in the usual manner.

It is thought that the construction, operation, and advantages of this invention will now be apparent to those skilled in this art without a more detailed description thereof. The present embodiment of the invention has been disclosed in detail merely by way of example, since in actual practice it attains the features of advantages enumerated as desirable in the statement of the invention and the above description.

It will be apparent that changes in the details of construction, and in the combination and arrangement of parts may be resorted to without departing from the spirit or scope of the invention as hereinafter claimed, or sacrificing any of its advantages.

Having thus described my invention, what I claim as new is:—

1. A device of the class described including, in combination, a base, a quadrant on the base provided with a pair of spaced notches, a lever pivoted on the base, a dog pivoted on the lever engageable with the notches of the quadrant, a handle pivoted on the lever, a spring engaged with the handle and with the dog for normally holding the dog in an engaged position, a link engaged with the dog and with the handle so that by swinging the handle the dog may be released.

2. A device of the class described including, in combination, a base, a quadrant on the base provided with a pair of spaced notches, a lever pivoted on the base, a dog pivoted on the lever engageable with the notches of the quadrant, a handle pivoted on the lever, a spring engaged with the handle and with the dog for normally holding the dog in an engaged position, a link engaged with the dog and with the handle so that by swinging the handle the dog may be released, a telescopic rod pivotally engaged with an intermediate portion of the lever and adapted to be engaged with the clutch pedal.

3. A device of the class described including, in combination, a base, a quadrant on the base provided with a pair of spaced notches, a lever pivoted on the base, a dog pivoted on the lever engageable with the notches of the quadrant, a handle pivoted on the lever, a spring engaged with the handle and with the dog for normally holding the dog in an engaged position, a link engaged with the dog and with the handle so that by swinging the handle the dog may be released, a telescopic rod pivotally engaged with an intermediate portion of the lever and adapted to be engaged with the clutch pedal, a spring engaged with an intermediate portion of the lever for normally swinging it to a position for releasing the clutch pedal, and means for tensioning the spring.

4. A device of the class described including, in combination, a base, a quadrant on the base provided with a pair of spaced notches, a lever pivoted on the base, a dog pivoted on the lever engageable with the notches of the quadrant, a handle pivoted on the lever, a spring engaged with the handle and with the dog for normally holding the dog in an engaged position, a link engaged with the dog and with the handle so that by swinging the handle the dog may be released, a telescopic rod pivotally engaged with an intermediate portion of the lever and adapted to be engaged with the clutch pedal, a spring engaged with an intermediate portion of the lever for normally swinging it to a position for releasing the clutch pedal, means for tensioning the spring, a cable attached to the handle in order that it may be operated at a distance from the tractor.

5. A device of the class described including, in combination, a base, a quadrant on the base having a pair of spaced notches, a lever pivoted on the base, a dog pivoted on the lever engageable with the notches of the quadrant, a handle in the end of the lever, a link pivoted to the handle and to the dog so that by swinging the handle in one direction, the dog may be released, a spring engaged with the handle and the dog for normally holding the dog engaged in one of the notches, a cable attached to the handle in order that it may be operated from a remote point, a rod section pivotally engaged with the handle at an intermediate portion thereof, a tubular rod section receiving the first rod section, means on the tubular rod section for attaching it to a clutch pedal, a spring in the tubular rod section for impinging against the inner rod section, a spring engaged with an intermediate portion of the lever for urging it to a position to release the clutch, and tensioning means associated with said last mentioned spring.

In testimony whereof I affix my signature.

LEIF HOFSTAD.